US012010490B1

(12) United States Patent
Delikaris Manias et al.

(10) Patent No.: US 12,010,490 B1
(45) Date of Patent: Jun. 11, 2024

(54) AUDIO RENDERER BASED ON AUDIOVISUAL INFORMATION

(71) Applicant: Apple Inc., Cupertino, CA (US)

(72) Inventors: Symeon Delikaris Manias, Los Angeles, CA (US); Mehrez Souden, Los Angeles, CA (US); Ante Jukic, Culver City, CA (US); Matthew S. Connolly, San Jose, CA (US); Sabine Webel, San Francisco, CA (US); Ronald J. Guglielmone, Jr., Redwood City, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/149,659

(22) Filed: Jan. 3, 2023

Related U.S. Application Data

(63) Continuation of application No. 17/370,679, filed on Jul. 8, 2021, now Pat. No. 11,546,692.

(60) Provisional application No. 63/151,515, filed on Feb. 19, 2021, provisional application No. 63/067,735, filed on Aug. 19, 2020.

(51) Int. Cl.
*H04R 3/00* (2006.01)
*H04R 5/04* (2006.01)

(52) U.S. Cl.
CPC ............... *H04R 3/005* (2013.01); *H04R 5/04* (2013.01)

(58) Field of Classification Search
None
See application file for complete search history.

(56) References Cited

U.S. PATENT DOCUMENTS

| | | | | |
|---|---|---|---|---|
| 8,150,063 | B2 * | 4/2012 | Chen | H04R 3/005 381/91 |
| 9,338,420 | B2 * | 5/2016 | Xiang | G11B 27/28 |
| 9,769,588 | B2 * | 9/2017 | Shenoy | H04R 3/005 |
| 10,178,490 | B1 * | 1/2019 | Sheaffer | G06T 7/20 |
| 2010/0123785 | A1 * | 5/2010 | Chen | H04N 23/611 382/118 |
| 2019/0222950 | A1 * | 7/2019 | Sheaffer | G06T 7/20 |

* cited by examiner

*Primary Examiner* — Paul W Huber
(74) *Attorney, Agent, or Firm* — Aikin & Gallant, LLP

(57) ABSTRACT

An audio renderer can have a machine learning model that jointly processes audio and visual information of an audio-visual recording. The audio renderer can generate output audio channels. Sounds captured in the audiovisual recording and present in the output audio channels are spatially mapped based on the joint processing of the audio and visual information by the machine learning model. Other aspects are described.

20 Claims, 7 Drawing Sheets

AUDIO RENDERER BASED ON AUDIOVISUAL INFORMATION

CROSS-REFERENCE TO RELATED APPLICATION

This application claims the benefit of U.S. Provisional Patent Application No. 63/067,735 filed Aug. 19, 2020 and U.S. Provisional Patent Application No. 63/151,515 filed Feb. 19, 2021, which are both incorporated by reference herein in their entirety.

FIELD

One aspect of the disclosure herein relates to processing audio based on audiovisual information.

BACKGROUND 3D audio rendering includes processing of an audio signal (such as a microphone signal or other recorded or synthesized audio content) so as to yield sound produced by a multi-channel speaker setup, e.g., stereo speakers, surround-sound loudspeakers, speaker arrays, or headphones. Sound produced by the speakers can be perceived by the listener as coming from a particular direction or all around the listener in three-dimensional space.

Audio systems that capture or process audio and visual tracks generally process audio and visual information separately. Audio features are typically used for enhancement, separation of sounds, or spatial audio rendering. After the audio is processed, the result is merged with the video, without consideration of joint information.

SUMMARY

Generally, audio systems do not perform joint optimization using audio and visual information. In such systems, visual features for rendering are not exploited in the processing of the audio. Likewise, algorithms for video processing can be used to enhance the video, such as mapping from one format to another (for example, an extended reality format). Audio information, however, typically is not considered in the video processing algorithms. Human perception, on the other hand, fuses both visual and audio cues to make sense of the surrounding environment.

For example, humans are aware of sound coming from above because the human auditory system, which includes the outer ear, middle ear, inner ear, and neuronal structure, can perform sound localization. Simultaneously, humans can see, with eyes, that a helicopter is flying above, thus confirming and reinforcing that a helicopter is producing a sound from above.

In the present disclosure, audio and video streams are jointly processed by a machine learning model to spatially render audio. The audio and video input to the machine learning model can be a synchronized audiovisual work, e.g., synchronized in time, such that the machine learning model can correlate information between the audio and video streams. Spatial information of the input audio can be inferred by the machine learning model based on spatial cues in the audio (e.g., a plurality of microphone signals), visual features, and/or inferred relationships between the audio and visual information. Instead of constructing an analytical model that combines audio and video streams, the system can use a machine learning model to infer joint latent representation of spatial information contained in the audio and video streams. The audio can be spatially enhanced based on the joint latent information.

In some aspects, a method or system for performing the same, is described. The method includes providing to a machine learning model, one or more microphone signals (input audio), one or more video signals (input video). The one or more microphone signals and video signals can represent a synchronized audio visual recording. For example, a movie scene or a live musical performance or a video chat can be recorded by a recording device that has one or more cameras and microphones.

The one or more microphone signals and the one or more video signals are jointly processed (e.g., simultaneously used as input) with the machine learning model so that the machine learning model infers latent correlations between the audio and video signals. The machine learning model, can generate a plurality of output audio channels having one or more sounds that are represented in the one or more microphone signals that are spatially mapped to a target scene. The target scene here refers to how sound sources will be presented visually and acoustically to a user. The target scene can be the same as the recorded scene, or different. The output audio channels are generated by the machine learning model based on relationships that the machine learning model recognizes between the one or more sounds that are represented in the one or more microphone signals and visual information represented in the one or more video signals.

In some aspects, one or more audio features and/or one or more visual features are used as input to the machine learning model. The machine learning model can process these features in addition to, or alternative to, the microphone signals. Based on the processing of the features, the machine learning model can generate output audio channels. Features are generalized variables or attributes generated based on data, such as the audio data represented in the one or more microphone signals, and visual data represented in the one or more video signals, that can be used as input to a machine learning model. Different algorithms can be employed to select features, for example, 'universal selection', 'feature importance, 'correlation matrix with heatmap', etc. Feature engineering algorithms and techniques are can be used to enhance training datasets for a machine learning model. The training dataset can include different features, for example, an audio feature may be 'voice' while a visual feature may be 'person', 'person speaking', 'head', 'dog', 'car', 'tire', other visually detectable object.

In some aspects, rather than generating a plurality of output audio channels, the machine learning model can be trained to generate mapping parameters that are associated with output channels of a target output audio format. These mapping parameters can be applied to one or more of the microphone signals (or a combination of the microphone signals) to produce output audio channels. Output channels can be used to drive one or more speakers such as a left speaker and right speaker of a headphone set; speakers of a loudspeaker format (e.g., 5.1 or 7.2), a circular speaker array, or other pre-defined speaker arrangements. Mapping parameters can include, for example, beamforming filters, direction of arrival estimation, diffuseness, inter-channel level difference, inter-channel time difference (e.g., delays between channels), direct-to-diffuse ratio, sound field energy, reverberation time, and/or frequency response.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below and particularly pointed out in the Claims section. Such combinations may have particular advantages not specifically recited in the above summary.

BRIEF DESCRIPTION OF THE DRAWINGS

Several aspects of the disclosure here are illustrated by way of example and not by way of limitation in the figures of the accompanying drawings in which like references indicate similar elements. It should be noted that references to “an” or “one” aspect in this disclosure are not necessarily to the same aspect, and they mean at least one. Also, in the interest of conciseness and reducing the total number of figures, a given figure may be used to illustrate the features of more than one aspect of the disclosure, and not all elements in the figure may be required for a given aspect.

DETAILED DESCRIPTION

Several aspects of the disclosure with reference to the appended drawings are now explained. Whenever the shapes, relative positions and other aspects of the parts described are not explicitly defined, the scope of the invention is not limited only to the parts shown, which are meant merely for the purpose of illustration. Also, while numerous details are set forth, it is understood that some aspects of the disclosure may be practiced without these details. In other instances, well-known circuits, structures, and techniques have not been shown in detail so as not to obscure the understanding of this description.

Figure 1:
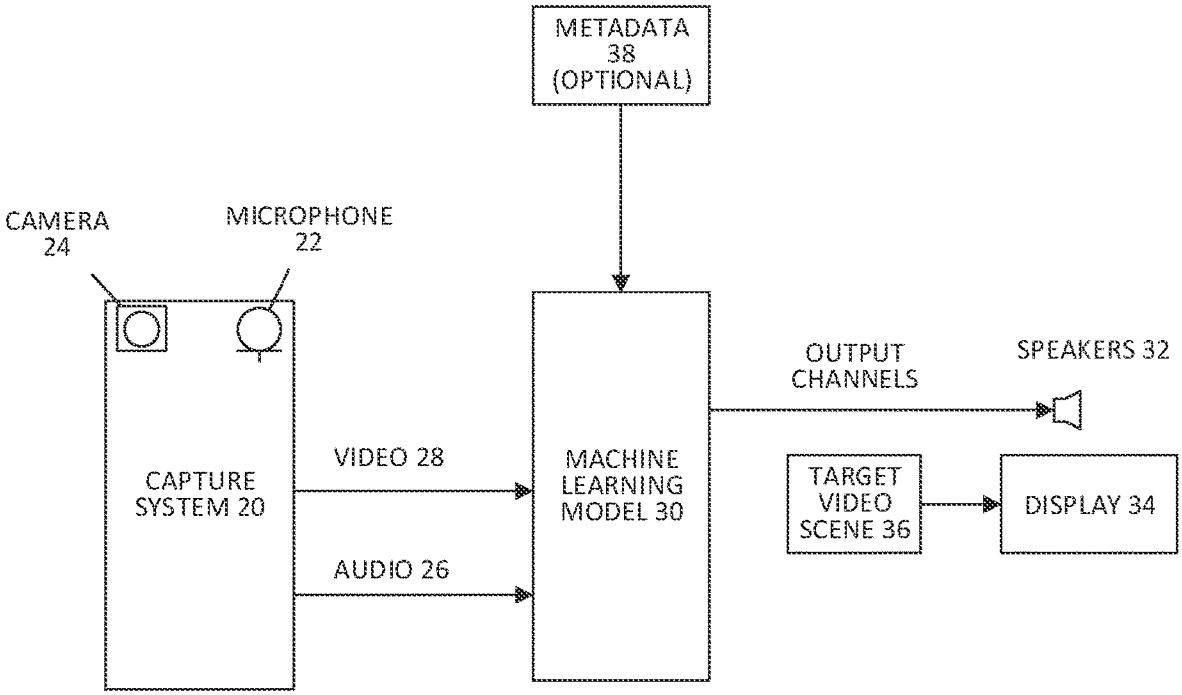
FIG. 1 shows a system and method of rendering audio using audiovisual information, according to some aspects.

Referring to FIG. 1, a system and method is shown that jointly processes audio and video with a machine learning model. A capture system 20 can include one or more cameras 24 and one or more microphones 22. One or more microphone signals generated by the one or more microphones form input audio 26. Similarly, one or more video signals generated by the one or more cameras form input video 28.

In some aspects, the one or more microphones 22 is a single microphone. In such a case, joint processing of the audio and video improves extraction of spatial information from the audiovisual work—the machine learning model can use both the audio and video to localize sound sources which would otherwise be a challenge with a single microphone signal without video. For example, if a video signal contains visual information indicating two people speaking side by side, and two voices are present in the single audio signal, the machine learning model can localize each of the voices based on activity in the video signal. Such a feat would be difficult based only on a single microphone signal.

In some aspects, if the first voice is detected concurrent with what is recognized by the machine learning model 30 as visual voice activity (e.g., moving lips and/or hand gestures), then the machine learning model can assign a location of the visual voice activity from a first object in the video to the first voice. Similarly, if a second voice is detected in the audio concurrent with visual voice activity from a second object in the video, then the machine learning model can assign a second location (the location of the second object) to the second voice.

In some aspects, the one or more microphones 22 include a plurality of microphones. In such a case, the machine learning model can detect spatial cues that are present in the plurality of microphones (e.g., based on signal delays and level differences between frequency bands of the different microphone signals). The machine learning model 30 can use these audio spatial cues concurrently with visual information to reinforce estimation of sound source positions present in the audiovisual recording. It should be noted that, for multi-microphone recording, the sensed sounds can be intermingled in the microphone signals. For example, a first microphone signal can contain sounds A, B, and C. A second microphone signal can contain sounds B, C, and D. And a third microphone signal can contain sounds A, B, C, D, and E.

In some aspects, if the audio system senses a first sound to be at a first position and a second sound to be at a position to the left of the first sound, and the video signal shows two people speaking side by side, then both audio and visual inputs corroborate each other, with which the machine learning model use to determine, with an improved confidence (than with separately processing audio and visual), that the first sound is on a right side and the second sound is on a left side as captured in the audiovisual recording.

The capture system 20 can be an electronic device such as, for example, a mobile phone, a tablet computer, a desktop computer, a laptop computer, a speaker, a headset, a camera, or any combination thereof. In some aspects, the one or more microphones 22 have fixed and known positions, thereby forming a microphone array.

The one or more cameras 24 can be analog video capture devices or standard digital electronic camcorders, for example, using charge coupled device (CCD) to produce digital video streams. Regardless of the format, the video signals carry visual information (e.g., representing sequences of images) captured by the one or more cameras.

In some aspects, the video is component video having two or more component channels, such as, for example, component analog video (CAV). In some aspects, the video is a digitally formatted video signal, for example, Flash Video, F4V, AVI, MPEG (any MPEG family), M4V, etc. Different audio and video signal formats can be utilized in the system without departing from the scope of the present disclosure.

At machine learning model 30, the one or more microphone signals and the one or more video signals are jointly processed. The machine learning model generates a plurality of audio output channels having one or more sounds that are represented in the one or more microphone signals that are spatially mapped to a target scene. The output audio channels are generated by the machine learning model 30 based on correlations between the one or more sounds that are represented in the one or more microphone signals and visual information represented in the one or more video signals. In this aspect, the machine learning model 30 is trained to perform the rendering of the output audio channels.

In some aspects metadata 38 is provided as input to the machine learning model. The metadata can define mapping from an initial scene (e.g., the audiovisual scene that is captured in the original audiovisual recording) to target scene. The target scene can, in some aspects, be different from the initial scene. In some aspects, the target scene is the same as the initial scene. The target scene can describe audio and visual playback to a user. For example, the target scene can define the output audio format, as well as a target video scene. If objects, which can be sound sources, are changed or moved from the initial recording to the target scene, then the audio mapping performed by the machine learning model would reflect this transformation.

In some aspects, a target output audio format is also provided as metadata to the machine learning model. The machine learning model can be trained to map the input audio to more than one output audio format. In such a case, the machine learning model can map the input audio to an output audio format that is specified in the metadata. For example, the metadata may specify that the output audio format is binaural audio. In response to this information, the machine learning model can generate a left and right output audio channel.

In some aspects, the machine learning model need not require metadata. The machine learning model can be trained to map the input audio to a particular target output audio format (based on the output audio format used in the training dataset) and a particular scene. The target scene can have a 1 to 1 spatial relationship with the scene of the initial recording such that sounds in the target scene are perceived to be spatially the same or similar to sounds in the recorded scene.

As described, the target output audio format can be binaural audio comprising a left audio channel and a right audio channel used to drive left and right speakers of a headphone set. Binaural recording is a method of recording sound that uses two microphones (e.g., arranged on or in a mannequin head at a left ear and a right ear) so that the resulting recording is perceived by a listener during playback to be a spatially accurate reproduction of the recording environment from the perspective of the two microphones. Thus, the machine learning model can generate a left audio channel and right audio channel based on the one or more microphone signals, with sounds mapped so that the left audio channel and right audio channel sound as if they were recorded as a binaural recording.

In some aspects, the target output audio format is a channel-based loudspeaker format, such as 5.1 or 7.1 or 7.2 surround sound system. In such a case, the target output audio can have output audio channels each assigned to a speaker that is defined by the format, such as, for example, left, right, center, sub, front left, back left, surround left, surround right, back left, and/or back right. The machine learning model can pan sounds in the output audio channels that are defined by the channel-based loudspeaker format. The machine learning model is trained to localize the sounds in audio based on spatial audio cues and/or visual cues based on joint processing by the machine learning model, to optimize the spatial understanding of the captured environment. For example, a sound that is localized in a front left region of the captured environment can be panned to a left front speaker, while a sound that is localized as back right can be panned to the back right speaker. Loudness differences and delays of a sound source from one speaker to another can provide a spatial audio experience.

In some aspects, the target output audio format is a spherical surround sound format such as Ambisonics. The target audio format can include an order of the Ambisonics. In some aspects, the target audio format is Ambisonics B-format that includes four or more channels (e.g., W, X, Y and Z channels). Each channel can represent a different directionality with respect to a sphere. Each directionality can represent a different polar pattern having a particular direction with respect to a sphere. W is an omni-directional polar pattern, containing all sounds in the sphere, coming from all directions at equal gain and phase. X is a figure-8 bi-directional polar pattern pointing forward. Y is a figure-8 bi-directional polar pattern pointing to the left. Z is a figure-8 bi-directional polar pattern pointing up. In some aspects, the target audio format specifies a higher order Ambisonics (HOA) format that includes additional channels, each representing additional polar patterns arranged in a particular direction with respect to the sphere. Spatial resolution of the Ambisonics audio asset increases as the number of channels increases. As the number of channels increases, however, so does asset size, complexity, and processing effort. Spherical surround sound audio such as Ambisonics are agnostic with regard to a final speaker layout and can be converted, at some point downstream, to a desired output speaker format (e.g., 5.1, 7.1, 7.2, binaural, etc.).

In some aspects, the machine learning model separates the audio sources and pans each of the audio sources in a direction based on localization of sound sources contained in the one or more microphones. The machine learning model can include sub-machine learning models that are trained independently (e.g., one machine learning model performs separation and another performs spatial rendering) and then joined and trained together to generate output audio channels based on input audio and video. For example, a first sub-machine learning model extract sound sources from the one or more microphone signals and output audio signals of the separated sources. A second sub-machine learning model can take these signals as input and spatially render the sound source signals in output audio channels.

The machine learning model can 'track' the sound sources with both the audio and visual information, as each audio source can move from one position to another over time (during a recording). By processing the audio and video information jointly with the machine learning model, the system can identify which source is active and determine where to pan the sounds in the target scene, even as the source moves around.

A target video scene 36 can be played through a display 34. The target video scene and the output audio channels can comprise an output audiovisual work where the audio and visual are synchronized. The display can be integral to a television, a computer laptop, a monitor, a mobile phone or tablet computer. In some aspects, the display is integral to a head mounted display which can be a head-up display (e.g., 'smart' glasses), or an electronic device that provides an extended reality experience. Various examples of electronic systems and techniques for using such systems in relation to various extended reality technologies are described.

Extended reality presents a challenge for augmenting virtual objects into the real world such that the real and the virtual blend together in a seamless fashion. An important aspect of this challenge is rendering virtual objects such that they sound as if they originate in the same acoustic space as the user. Rending the virtual object in this manner provides a realistic and immersive experience for the user. On the contrary, if the virtual object is rendered in a manner that does not resemble a sound emanating from the user's space, this can provide a disjointed and implausible audio experience.

In some aspects, the machine learning model 30 (or those described in other sections), speakers 32, display 34, or combinations thereof are integral to a playback device.

In some aspects, the target scene is specified by metadata and provided as input to the machine learning model. In some aspects, the target scene is visually the same as the recorded scene represented by the one or more video signals. The target output audio format, regardless of type, would spatially match the sound sources of the recording in such a case.

Figure 2:
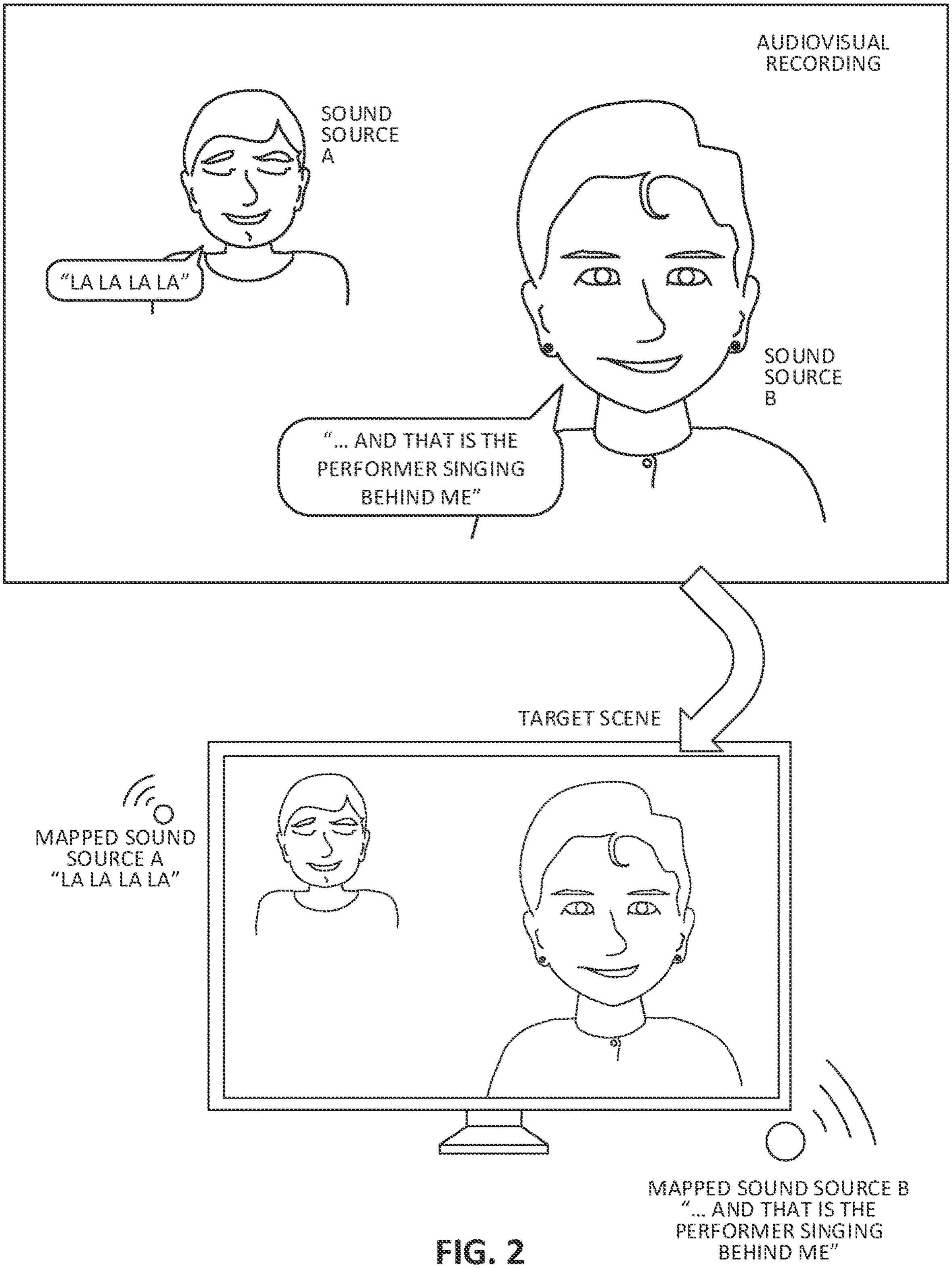
FIG. 2 illustrates an example of rendering audio to a target scene, according to some aspects.

For example, as shown in FIG. 2, if the original recording includes a sound source A (person singing) at the far left, and a sound source B (announcer) talking at the front right, then the target scene visually shows a sound source A at the far left and sound source B at the front right. If the display is part of a television, and the target output audio format is binaural audio, then as the television shows the video of the person singing at the far left and the announcer talking at the front right, the voice of the singer will be perceived at the far left of the display while voice of the announcer is perceived at the front right of the display, when heard through the left and right speakers of a headphone set.

In some aspects, a listener's head position can be tracked such that the spatialized sounds can be mapped relative to the user's display environment whether the display is on a 2D display (e.g., a television, computer monitor, or tablet computer) or on a device such as a head mounted display that supports extended reality. Known head-tracking hardware and software-implemented-algorithms (e.g., cameras, video odometry, inertial measurement units (IMUS), etc.) can be implemented by one or more components of a playback system (e.g., a HMD, headphone set, etc.) For example, if a listener turns her head, the output audio signals will be adjusted so that the announcer's voice is perceived to emanate from the visual representation of sound source B (e.g., on a television). Without adjustment, if the display remains fixed and the head moves, the audio and visual playback components may become disjointed.

In some aspects, the target scene is associated with a visual playback scene that is different from a scene represented by the one or more video signals. For example, the audio and video of the captured scene are still used as input, but a visual playback scene can contain one or more virtual representations (e.g., virtual objects) of the one or more sounds. For example, instead of showing the video with the announcer and the singer, the target scene shows animated computer generated characters (commonly known as avatars) in place of the announcer and/or singer. In some aspects, the avatars can have the same locations as those of the sound sources that are localized through processing of the original audio and video signals.

In other aspects, visual and audio can be modified spatially. In other words, the target scene can be different from the recording with regards to sound source locations. For example, audio and/or visual of the audiovisual recording can be flipped or transposed along an axis (e.g., a vertical axis) such that sounds recorded on the left will be heard and/or seen in the target scene on the right and vice versa from right to left. The target scene can be provided to the machine learning model as metadata, so that the machine learning model can render the output audio channels (or mapping parameters) accordingly.

Figure 3:
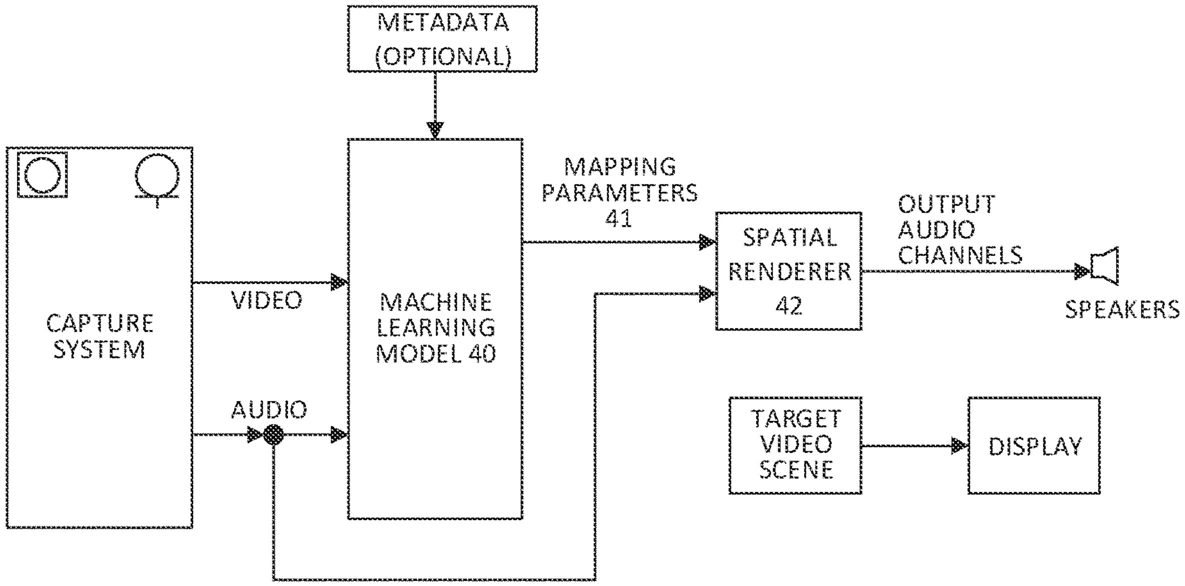
FIG. 3 shows a system and method of rendering audio using audiovisual information where a machine learning model outputs mapping parameters, according to some aspects.

FIG. 3 shows a system and method for audio processing with a machine learning model. The system includes a machine learning model 40 that jointly processes audio (one or more microphones) and video (one or more video streams captured by one or more cameras), similar to as described in FIG. 1. In this case, the machine learning model 40 generates mapping parameters 41 that, when applied to the one or more microphone signals generate output audio channels having the one or more sounds that are represented in the one or more microphone signals spatially mapped in the output audio channels. Instead of generating the output channels directly (as shown in FIG. 1), the machine learning model generates the mapping parameters that can be applied to one or more of the microphone signals to result in output audio channels associated with a target output audio format.

The mapping parameters can be generated by the machine learning model based on correlations between the one or more sounds that are represented in the one or more microphone signals and visual information represented in the one or more video signals. The mapping parameters can include beamforming filters, direction of arrival estimation, diffuseness, inter-channel level difference, inter-channel time difference (e.g., delays between channels), direct-to-diffuse ratio, sound field energy, reverberation time, and/or frequency response. These mapping parameters can be applied to one or more of the microphone signals to spatialize or pan sounds in different directions. For example, the mapping parameters can include frequency responses (gains and delays at different frequencies) associated with output audio channels of a target output audio format. A spatial renderer 42 can apply the frequency responses to one or more of the microphone signals to produce the output channels that are then used to drive speakers.

For example, if the target output audio format is binaural, then the mapping parameters can include a first set of frequency responses associated with a left output channel, and a second set of frequency responses associated with a right output channel. The renderer can apply the first set to a selected one of the microphone signals (or a combination thereof) to generate the left output channel, and apply the second set to a selected one of the microphone signals (which can also be selected one of the microphone signals or a combination thereof) to generate the right output channel.

In some aspects, one or more of the microphone signals are selected based on position (e.g., a first microphone is designated as the candidate for spatialization) or dynamically selected based on signal characteristics such as signal to noise ratio. In some aspects, the microphone signals are added together or averaged and then spatialized. This applies to aspects described in other figures as well. Regardless of how the microphone signals are selected or combined, a subset of the microphone signals can be spatialized at the spatial renderer 42 based on the mapping parameters 41 to generate the output audio channels.

Figure 4:
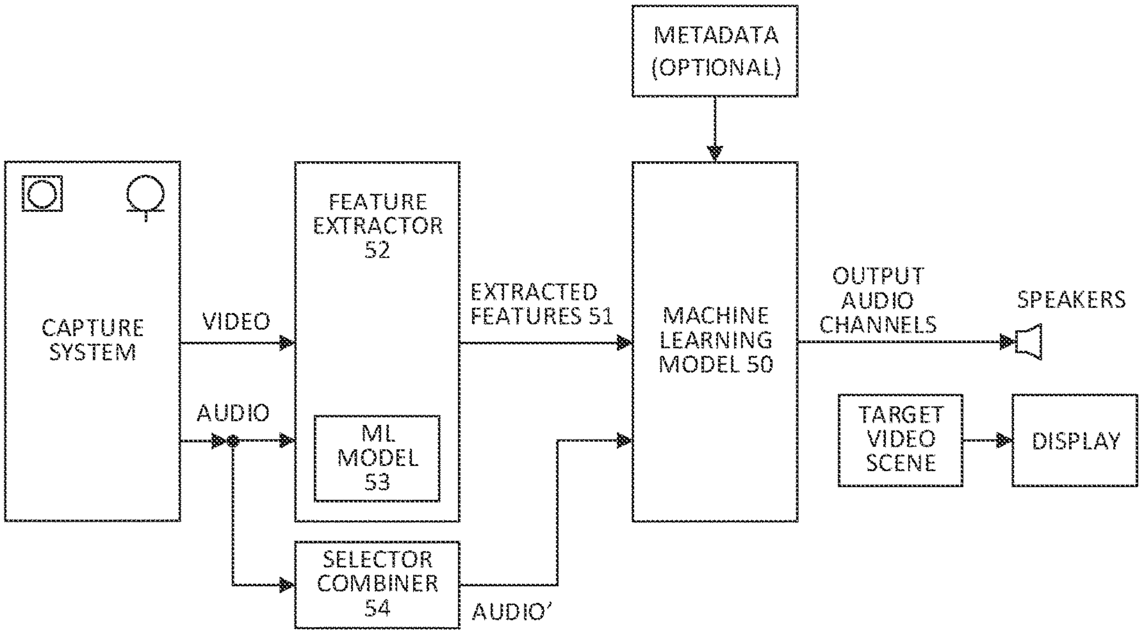
FIG. 4 and FIG. 5 shows a system and method of rendering audio using audiovisual information where a machine learning model processes extracted features, according to some aspects.

FIG. 4 shows a system and method for audio processing with a machine learning model 50 according to some aspects. The machine learning model 50 jointly processes a) one or more microphone signals (or a combination or subset of the one or more microphone signals as selected or combined at selector combiner 54), and b) one or more features 51. The one or more features include one or more visual features extracted from one or more video signals and/or one or more audio features extracted from the one or more microphone signals.

Feature extractor 52 can process the one or more video signals captured by the capture device to extract the visual features. Feature extraction includes methods of constructing combinations of the variables to get data with sufficient accuracy while minimizing complexity and number of variables associated with large datasets. For example, useful features can be extracted (e.g., a face, a body, a hand, etc.) that help a machine learning model define the objects (e.g., people) in the video. A feature (e.g., an audio or visual feature) is an individual measurable property or characteristic of a phenomenon being observed. Feature extraction reduces the number of resources required to describe a large set of data. Analysis of complex data sets can be difficult due to the large number of variables involved which can require a large amount of memory and computation power. Complex data sets may also cause a classification algorithm to overfit to training samples and generalize poorly to new samples. Thus, the extracted features help the machine learning model 40 process the recorded audiovisual information.

Features can be used as input to the machine learning model for generating output audio channels. For visual features, a feature can be a measurable piece of data in the video that may be unique to a specific object. The feature can be a distinct color or shape (including a line, edge, or image segment. In other words, the features help the machine learning model identify objects present in the video feed. The feature extractor 52 can use one or more feature extraction algorithms to extract one or more visual features which are used as input to the machine learning model (e.g., a visual feature vector input).

In some aspects, the feature extractor can include machine learning models 53 such as convolutional neural networks (CNNs) or other artificial neural networks (ANNs) that extract the visual features from the video feed. In some aspects the extracted features are features recognizable by a Visual Geometry Group (VGG) neural network. In some aspects, one or more machine learning models of the feature extractor include a VGG neural network trained with VGG training data to extract known VGG features from the input video. In other aspects (e.g., as shown in FIG. 1), the machine learning model 30 can be trained with VGG training data to perform feature detection and classification internally, rather than a separate feature extractor as shown in FIG. 4.

The feature extractor 52 can process the one or more microphone signals to extract audio features (e.g., an audio feature vector) that are used at input to the machine learning model. Speech recognition algorithms can be used to extract features relating to speech. Further, categorized datasets can be used to train the one or more machine learning models 53 of the feature extractor to extract audio and visual features.

In some aspects, the machine learning model 50 generates a plurality of output audio channels having one or more sounds that are represented in the one or more microphone signals that are spatially mapped to a target scene. The output audio channels are generated based on correlations between the one or more video features and the one or more audio features.

Figure 5:
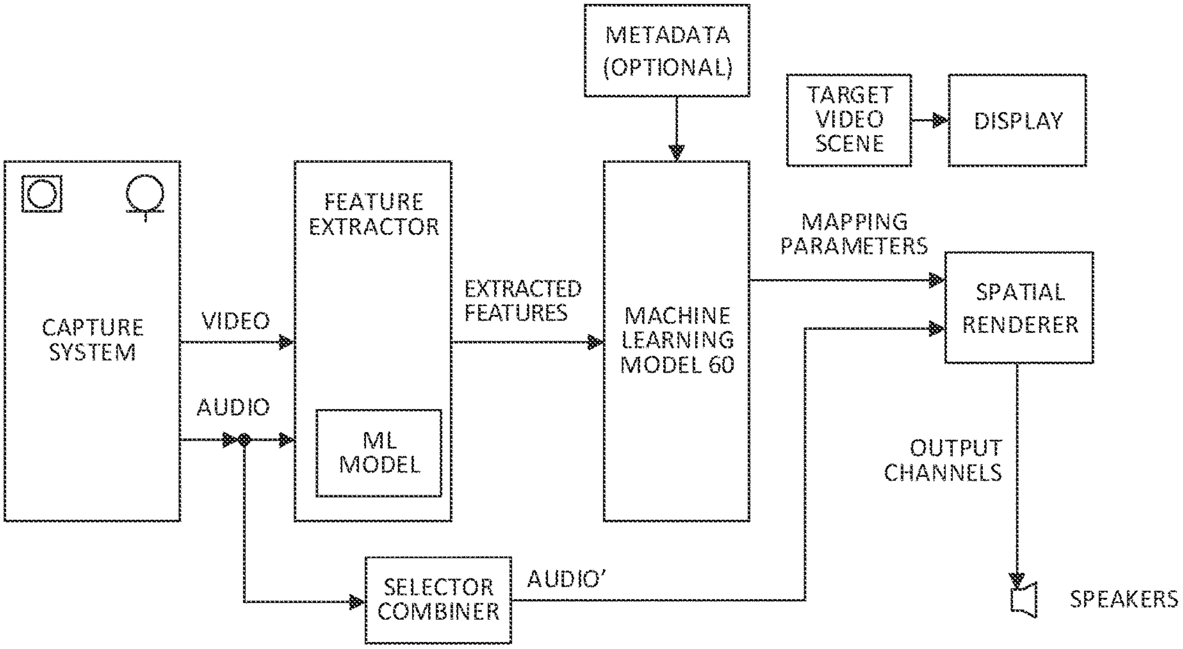

In some aspects, as shown in FIG. 5, rather generating the output audio channels, the machine learning model 60 generates mapping parameters (as described with relation to FIG. 3) based on visual features extracted from the video and audio features extracted from one or microphone signals (as described with relation to FIG. 4). In such a case, the inputs to the machine learning model 60 need not include one or more microphone signals as input.

The generated mapping parameters (e.g., frequency responses) can be applied to a subset (e.g., a selected one of) or combination of the microphone signals to generate output channels in the target audio format. In such a manner, the machine learning model 60 can offload processing to the feature extractor and spatial renderer, and allocate resources in a flexible manner. Different components and/or devices can be used to are perform feature extraction, generation of mapping parameters, and/or rendering of the output audio channels.

Training of the machine learning models described in the present disclosure can be performed with different datasets depending on the inputs and outputs described with respect to each of the figures. The training dataset can include a number of recordings (or features thereof) and corresponding formatted output audio channels (or mapping parameters) to reinforce the machine learning model to perform its designated task. The training can be performed using a sufficiently large database of simulated recordings (e.g., greater than 100, 200, or 500 recordings). The number of recordings can vary based on complexity (e.g., number of microphone signals, output channels, and spatial resolution.

The training data can be recorded using a microphone arrangement with the same number of microphones in the same positions that match that of the capture system. For example, if the machine learning model is going to be used to map recordings captured by a smart phone model ABC, then the recording device used to generate training data can either be a) the smart phone model ABC, or b) a set of microphones that resembles the make and geometrical arrangement of the microphones of smart phone model ABC.

Training an artificial neural network can involve using an optimization algorithm to find a set of weights to best map inputs (e.g., one or microphone signals, one or more video signals, and/or features) to outputs (e.g., output audio channels of mapping parameters). These weights are parameters that represent the strength of a connection between neural network nodes. The machine learning model can be trained to minimize the difference between a) the output audio channels (or mapping parameters) generated by the machine learning model based on the input training data, and b) approved output audio channels (or mapping parameters) of the training data. These recordings and the approved output audio channels of the training data can be described as input-output pairs, and these pairs can be used to train the machine learning models which is described as supervised training.

The training of the machine learning model can include using non-linear regression (e.g., least squares) to optimize a cost function to reduce error of the output of the machine learning model (as compared to the approved output of the training data). Errors (e.g., between the output and the approved output) are propagated back through the machine learning model, causing an adjustment of the weights which control the neural network algorithm. This process occurs repeatedly for each recording, to adjust the weights such that the errors are reduced. The same set of training data can be processed a plurality of times to refine the weights. The training can be completed once the errors are reduced to satisfy a threshold, which can be determined through routine test and experimentation.

For example, in FIG. 1, the machine learning model can be trained with audio and visual training sets that include raw capture captured microphone signals and video, and spatially formatted audio of those captured microphone signals in the desired audio output format. The training reinforces the machine learning model's ability to localize the sound sources in the audio based on the audio and video recordings and map the sound sources in output audio channels that form the desired output audio format (e.g., binaural, 5.1, 7.1, 7.2, Ambisonics, etc.).

Similarly, machine learning model 40 (FIG. 3) can be trained with audio and video recordings and mapping parameters to enforce the machine learning model to reduce error between mapping parameters output by the model during training, and those of the training dataset. Similarly, machine learning models 50 and 60 (FIG. 4 and FIG. 5, respectively) can be trained using the audio and visual features as the input. Machine learning model 50 can be trained to reduce error between the output channels of the machine learning model and audio channels of training data. Similarly, machine learning model 60 can be trained to reduce error between the output mapping parameters and mapping parameters of training data.

In some aspects, training data can include video stream features, VGG features used for images analysis. Audio features similar to VGG features can be used for audio classification, and lip reading embeddings can be used to train for voice activity detection/speech separation. In some aspects, training set data can include raw time domain audio used in conjunction with time domain neural networks in the style of binaural Conv-TasNet. In some aspects, frequency domain neural networks operating on the log spectral and spatial features in the microphone array signals are used to train the machine learning model.

In some aspects, the machine learning models described in the present disclosure can each include a plurality of machine learning models that are integrated together. These sub-machine learning models can be trained separately to a) extract sounds contained in the one or more microphone signals, and b) render the sounds to output audio channels with spatial cues according to a target audio output format. The trained sub-models can then be combined and then trained together with training datasets.

Figure 7:
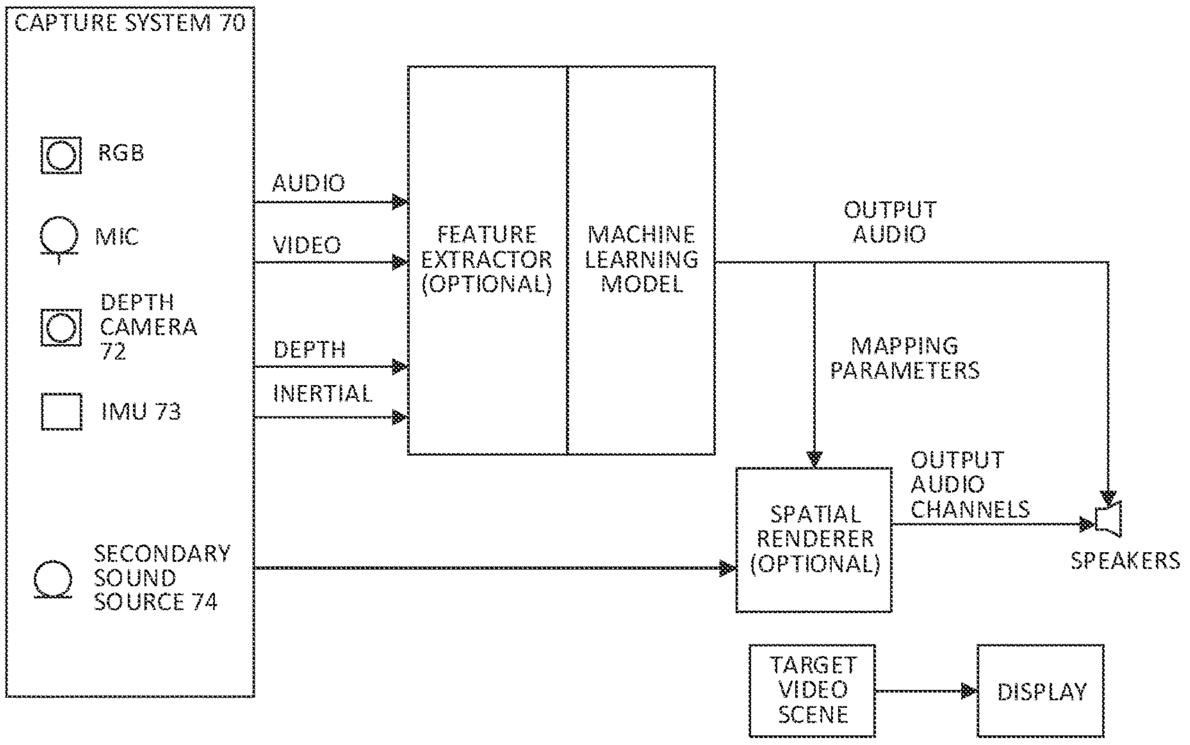
FIG. 7 shows a system and method of rendering audio using a machine learning model to process sensed information, according to some aspects.

FIG. 7 shows a system and method of rendering audio using a machine learning model to process sensed information according to some aspects. Additional features such as depth camera 72 and inertial measurement unit 73 are shown relating to capture system 70. Such features can provide enhanced functionality in combination with aspects described with reference to FIGS. 1-5.

In some aspects, the capture system 70 can include a depth camera 72 that captures depth information of the audio/visual scene. The depth camera can include an infrared (IR) light source and IR sensor that senses an IR pattern reflected by the objects in the environment of the capture system. In some aspects, the depth camera and the video camera are integral to an RGB-D camera. In some aspects, the depth camera determines depth based on stereo-vision of two or more cameras. The depth camera can include other depth capture technology that is known.

The depth information includes depth of objects captured in the same scene as the audio and video data. As such, the depth information includes sources of the sounds in the audio data, and those sources can be mapped to objects in the video data (e.g., a person speaking). A depth signal can be processed at block 74, which can be a machine learning model (as described in FIGS. 1 and 3). In some aspects, a feature extractor extracts depth features from the depth signal and feeds these into a machine learning model (as described in FIGS. 4 and 5).

As mentioned, the machine learning model can generate mapping parameters to be used by a spatial renderer to generate output audio channels. In some aspects, the machine learning model generates the output audio channels directly. In either case, the plurality of output audio channels can be spatially mapped to the target scene based on the correlations between a) the one or more sounds that are represented in the one or more microphone signals, b) the visual information represented in the one or more video signals, and c) the depth signal. As such, the machine learning model can gauge how far away sound sources are from a virtual position of a listener, and render the sounds accordingly.

In some embodiments, a secondary sound source 74 is separate from the audio (e.g., the one or more microphone signals) that is processed by the machine learning model. The secondary sound source can be used by the spatial renderer to render the secondary sound source according to the mapping parameters determined by the machine learning model.

For example, the machine learning model may determine mapping of the original sound sources to the target scene based on the capture data (e.g., audio, video, depth, inertial info). The mapping can include location (and/or orientation) of each sound source (e.g., speech of person) in a target scene. The secondary sound source can be spatially rendered based on those mapping parameters to take the place of one of the original sound sources present in the audio that was originally processed by the machine learning model, thereby providing flexibility in selection of playback audio. For example, the secondary sound source can be another microphone that is located on or near a speaking person that may have an improved acoustic pickup of the speaking person as compared to the microphone signal that is processed by the machine learning model. In another example, the secondary sound source can be a microphone of a different speaker or a different sound source that is not present in the original audio.

In some aspects, the capture system can include an inertial measurement unit (IMU) 73 that includes an accelerometer and/or gyroscope. A movement signal can include translational movement (e.g., a change in X, Y, and/or Z), and/or rotational movement (e.g., a change in azimuth and/or elevation, or other spherical coordinates). The movement signal, or features extracted from the movement signal, can be processed by the machine learning model to determine correlations between a) the audio, b) the video, and c) the movement data. The machine learning model can then generate mapping parameters (used by the spatial renderer) or generate output audio channels directly, such that the plurality of output audio channels are spatially mapped to the target scene further based on correlations between the one or more sounds that are represented in the one or more microphone signals, the visual information represented in the one or more video signals, and the movement signal.

As discussed, the machine learning model can generate audio output directly, as described with reference to FIGS. 1 and 4, or mapping parameters that are processed by a spatial renderer, as described with reference to FIGS. 3 and 5. The machine learning model can be trained to generate the audio output or the mapping parameters based on any combination of the inputs received from the capture system such as the depth information, the movement information, the audio, and the video data, based on correlations between such inputs, as described in other sections.

Figure 8:
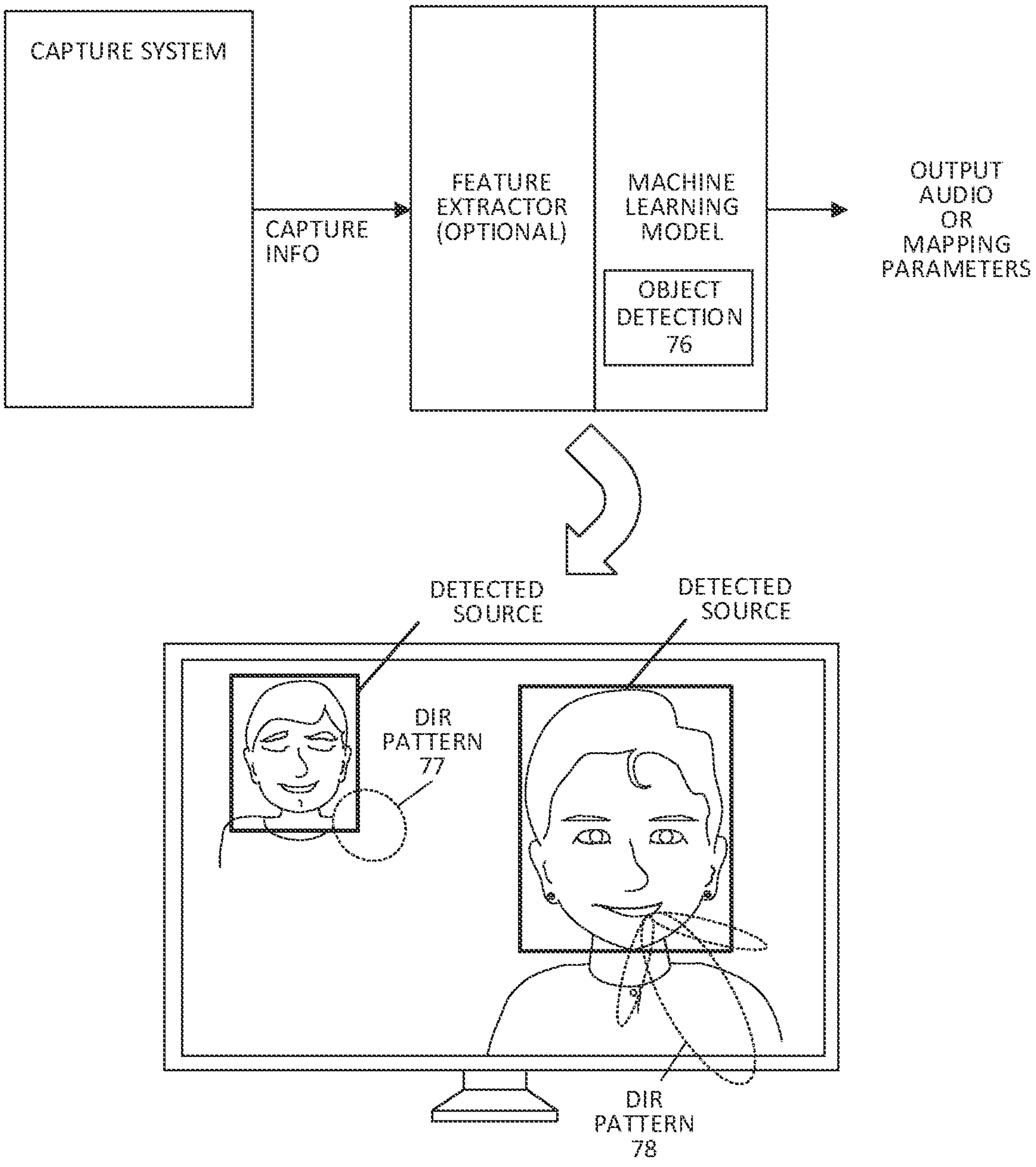
FIG. 8 shows audio rendering with a machine learning model and object recognition, according to some aspects.

As shown in FIG. 8, a machine learning model can include an object detection module 76 that is trained to recognize sound sources, for example, a moving mouth. Object detection is a computer technology related to computer vision and image processing that deals with detecting instances of semantic objects of a certain class (such as humans, a face, buildings, or cars) in digital images and videos. Object detection can include face detection. The object detection module can include a trained machine learning model, one or more trained neural networks, and/or other object detection algorithms that are known.

The object detection module can determine an orientation of the sound source based on detected features. For example, based on detected eyes, nose, and/or mouth, the location and orientation of the sound source can be determined. From this, the machine learning model can determine an orientation (a direction) of the sound source that is mapped to the location of the sound source.

In some aspects, the machine learning model can generate a directivity pattern (77, 78) of each sound source based on the capture info (e.g., the video, audio, movement data, and/or depth data) and/or object recognition. A directivity pattern refers to a polar pattern of the sound source, which can include a number of lobes, a size, and/or direction of each lobe. The machine learning model can be trained to determine the directivity pattern based on a type of sound source (which may indicate how directional a sound is), a location of the object (e.g., the farther away the sound source is, the less lobes the directivity pattern contains), and/or orientation of the sound source. The directivity pattern can have a location and/or an orientation in the target audio scene.

For example, the object detection module can recognize a speaker in the video data, and generate the audio output or mapping parameters for the audio output based on the orientation of the speaker (e.g., spherical coordinates). As such, a sound source can be mapped with 3 degrees of freedom (e.g., having X, Y, and Z coordinates) or 6 degrees of freedom (e.g., X, Y, Z, and spherical coordinates) in a target scene.

Figure 6:
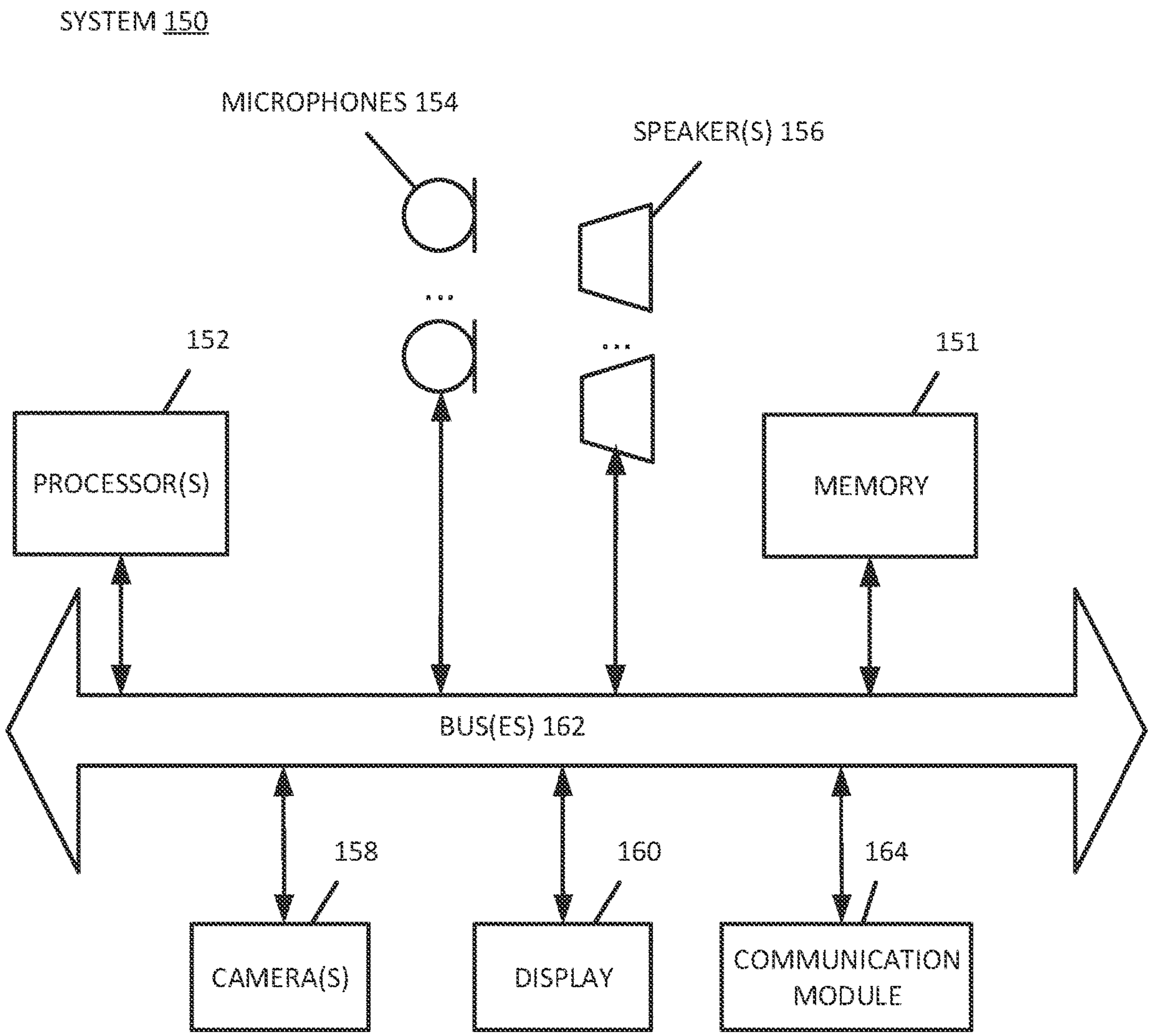
FIG. 6 shows an example audio system, according to some aspects.

FIG. 6 is an example implementation of the audio systems such as a capture device (or system) or a playback device (or system) described in other sections. Note that although this example shows various components of an audio processing system that may be incorporated into headphones, speaker systems, microphone arrays and entertainment systems, it is merely one example of a particular implementation and is merely to illustrate the types of components that may be present in the audio processing system.

It should be understood that other aspects described in relation to FIG. 1 or the other figures also apply to FIG. 2, unless context dictates otherwise. For example, in FIG. 3, the machine learning model generates mapping parameters 41 rather than generating output channels (as shown in FIG. 1). Similarly, features described relating to the capture system, metadata, and output through the display and speakers of FIG. 1 also apply to aspects shown but not described in detail in the other figures.

This example is not intended to represent any particular architecture or manner of interconnecting the components as such details are not germane to the aspects herein. It will also be appreciated that other types of audio processing systems that have fewer components than shown or more components than shown in this example audio system can also be used. For example, some operations of the process may be performed by electronic circuitry that is within a headset housing while others are performed by electronic circuitry that is within another device that is communication with the headset housing, e.g., a smartphone, an in-vehicle infotainment system, or a remote server. Accordingly, the processes described herein are not limited to use with the hardware and software shown in this example in FIG. 6.

FIG. 6 is an example implementation of the audio systems and methods described above in connection with other figures of the present disclosure, that have a programmed processor 152. The components shown may be integrated within a housing, such as that of a smart phone, a smart speaker, a tablet computer, a head mounted display, head-worn speakers, or other electronic device described in the present disclosure. These include one or more microphones 154 which may have a fixed geometrical relationship to each other (and are therefore treated as a microphone array.) The audio system 150 can include speakers 156, e.g., ear-worn speakers or loudspeakers.

The microphone signals may be provided to the processor 152 and to a memory 151 (for example, solid state non-volatile memory) for storage, in digital, discrete time format, by an audio codec. The processer 152 may also communicate with external devices via a communication module 164, for example, to communicate over the internet. The processor 152 is can be a single processor or a plurality of processors.

The memory 151 has stored therein instructions that when executed by the processor 152 perform the processes described herein the present disclosure. Note that some of these circuit components, and their associated digital signal processes, may be alternatively implemented by hardwired logic circuits (for example, dedicated digital filter blocks, hardwired state machines.) The system can include one or more cameras 158, and/or a display 160 (e.g., a head mounted display).

Various aspects descried herein may be embodied, at least in part, in software. That is, the techniques may be carried out in an audio processing system in response to its processor executing a sequence of instructions contained in a storage medium, such as a non-transitory machine-readable storage medium (for example DRAM or flash memory). In various aspects, hardwired circuitry may be used in combination with software instructions to implement the techniques described herein. Thus the techniques are not limited to any specific combination of hardware circuitry and software, or to any particular source for the instructions executed by the audio processing system.

In the description, certain terminology is used to describe features of various aspects. For example, in certain situations, the terms "renderer", "processor", "combiner", "synthesizer", "component," "unit," "module," "model", "extractor", "selector", and "logic" are representative of hardware and/or software configured to perform one or more functions. For instance, examples of "hardware" include, but are not limited or restricted to an integrated circuit such as a processor (for example, a digital signal processor, microprocessor, application specific integrated circuit, a micro-controller, etc.). Of course, the hardware may be alternatively implemented as a finite state machine or even combinatorial logic. An example of "software" includes executable code in the form of an application, an applet, a routine or even a series of instructions. As mentioned above, the software may be stored in any type of machine-readable medium.

It will be appreciated that the aspects disclosed herein can utilize memory that is remote from the system, such as a network storage device which is coupled to the audio processing system through a network interface such as a modem or Ethernet interface. The buses 162 can be connected to each other through various bridges, controllers and/or adapters as is well known in the art. In one aspect, one or more network device(s) can be coupled to the bus 162. The network device(s) can be wired network devices (e.g., Ethernet) or wireless network devices (e.g., WI-FI, Bluetooth). In some aspects, various aspects described (e.g., extraction of voice and ambience from microphone signals described as being performed at the capture device, or audio and visual processing described as being performed at the playback device) can be performed by a networked server in communication with the capture device and/or the playback device.

Some portions of the preceding detailed descriptions have been presented in terms of algorithms and symbolic representations of operations on data bits within a computer memory. These algorithmic descriptions and representations are the ways used by those skilled in the audio processing arts to most effectively convey the substance of their work to others skilled in the art. An algorithm is here, and generally, conceived to be a self-consistent sequence of operations leading to a desired result. The operations are those requiring physical manipulations of physical quantities. It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of an audio processing system, or similar electronic device, that manipulates and transforms data represented as physical (electronic) quantities within the system's registers and memories into other data similarly represented as physical quantities within the system memories or registers or other such information storage, transmission or display devices.

The processes and blocks described herein are not limited to the specific examples described and are not limited to the specific orders used as examples herein. Rather, any of the processing blocks may be re-ordered, combined or removed, performed in parallel or in serial, as necessary, to achieve the results set forth above. The processing blocks associated with implementing the audio processing system may be performed by one or more programmable processors executing one or more computer programs stored on a non-transitory computer readable storage medium to perform the functions of the system. All or part of the audio processing system may be implemented as, special purpose logic circuitry (e.g., an FPGA (field-programmable gate array) and/or an ASIC (application-specific integrated circuit)). All or part of the audio system may be implemented using electronic hardware circuitry that include electronic devices such as, for example, at least one of a processor, a memory, a programmable logic device or a logic gate. Further, processes can be implemented in any combination hardware devices and software components.

While certain aspects have been described and shown in the accompanying drawings, it is to be understood that such aspects are merely illustrative of and not restrictive on the broad invention, and the invention is not limited to the specific constructions and arrangements shown and described, since various other modifications may occur to those of ordinary skill in the art. The description is thus to be regarded as illustrative instead of limiting.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A method comprising:
receiving a visual feature associated with a video signal and an audio feature associated with a sound captured in a microphone signal;
receiving metadata comprising a target scene that includes a visual representation of the sound; and
determining, as output of a machine learning (ML) model using 1) the visual feature, 2) the audio feature, and 3) the target scene as input, one or more mapping parameters that, when applied to the microphone signal, generates one or more output audio channels that includes the sound of the microphone signal that is spatially mapped according to a location of the visual representation within the target scene and the mapping parameters are determined based on one or more correlations between the sound and the visual feature.

2. The method of claim 1, wherein the one or more mapping parameters includes a direction-of-arrival (DoA) estimation of the sound.

3. The method of claim 1, wherein the one or more mapping parameters includes the location of the visual representation of the sound within the target scene.

4. The method of claim 1, wherein the target scene is visually the same as a record scene represented by the video signal.

5. The method of claim 1, wherein the visual representation is a virtual object associated with a recorded object that is a sound source of the sound within a recorded scene of the video signal, wherein the location of the virtual object within the target scene is different than a location of the recorded object within the recorded scene.

6. The method of claim 1, wherein the one or more output audio channels are associated with a target output audio format that is one of: a binaural audio format comprising a left audio channel and a right audio channel, a channel-based loudspeaker format, and a spherical surround sound format.

7. The method of claim 1, wherein the visual representation is an avatar of a person within a recorded scene represented by the video signal, wherein the person is a sound source for the sound.

8. A non-transitory machine-readable medium storing instructions that, when executed by one or more processors of an electronic device, cause the electronic device to:
receive a visual feature associated with a video signal and an audio feature associated with a sound captured in a microphone signal;
receive metadata comprising a target scene that includes a visual representation of the sound; and
determine, as output of a machine learning (ML) model using 1) the visual feature, 2) the audio feature, and 3) the target scene as input, one or more mapping parameters that, when applied to the microphone signal, generates one or more output audio channels that includes the sound of the microphone signal that is spatially mapped according to a location of the visual representation within the target scene and the mapping parameters are determined based on one or more correlations between the and the visual feature.

9. The non-transitory machine-readable medium of claim 8, wherein the one or more mapping parameters includes a direction-of-arrival (DoA) estimation of the sound.

10. The non-transitory machine-readable medium of claim 8, wherein the one or more mapping parameters includes the location of the visual representation of the sound within the target scene.

11. The non-transitory machine-readable medium of claim 8, wherein the target scene is visually the same as a record scene represented by the video signal.

12. The non-transitory machine-readable medium of claim 8, wherein the visual representation is a virtual object associated with a recorded object that is a sound source of the sound within a recorded scene of the video signal, wherein the location of the virtual object within the target scene is different than a location of the recorded object within the recorded scene.

13. The non-transitory machine-readable medium of claim 8, wherein the one or more output audio channels are associated with a target output audio format that is one of: a binaural audio format comprising a left audio channel and a right audio channel, a channel-based loudspeaker format, and a spherical surround sound format.

14. An electronic device comprising:

at least one processor; and memory having instructions stored therein which when executed by the at least one processor causes the electronic device to:

receive input audio data that includes a sound, video data, and metadata comprising a target scene that includes a visual representation of the sound; and generate output audio data in a target output audio format as output of a machine learning (ML) model using 1) the input audio data, 2) the video data, and 3) the target scene as input, wherein the ML model maps the input audio data to the output audio data according to the target output audio format, wherein the output audio data comprises the sound that is spatially mapped according to a location of the visual representation within the target scene, wherein the ML model outputs the output audio data based on one or more correlations between the sound and visual information of the video data.

15. The electronic device of claim 14, wherein the target output audio format is defined in the metadata.

16. The electronic device of claim 14, wherein the target output audio format comprises at least one of: a binaural audio format, a channel-based loudspeaker format, and a spherical surround sound format.

17. The electronic device of claim 14, wherein the target output audio format is a first audio format, wherein the input audio data is in a second audio format that is different than the first audio format.

18. The electronic device of claim 14, wherein the target scene is visually the same as a scene represented by the video data.

19. The electronic device of claim 14, wherein the visual representation is a virtual object associated with a recorded object that is a sound source of the sound within a recorded scene represented by the video data, wherein the location of the virtual object within the target scene is different than a location of the recorded object within the recorded scene.

20. The electronic device of claim 14, wherein the output audio data is generated based on mapping the sound of the input audio data to the location of the visual representation within the target scene that is defined in the metadata.

* * * * *